(12) United States Patent
Svoboda et al.

(10) Patent No.: US 6,279,394 B1
(45) Date of Patent: Aug. 28, 2001

(54) MASS AIR FLOW METER

(75) Inventors: Mark Henry Svoboda, Swartz Creek; Gregory Paul Gee, Waterford, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/455,055

(22) Filed: Dec. 6, 1999

(51) Int. Cl.[7] .................................................... G01F 1/68

(52) U.S. Cl. ........................................................ 73/204.26

(58) Field of Search ............................ 73/204.26, 204.22, 73/204.23, 204.24, 204.25, 207.27

(56) References Cited

U.S. PATENT DOCUMENTS

| | | | |
|---|---|---|---|
| 4,651,564 | * | 3/1987 | Johnson et al. ........................ 73/104 |
| 5,852,239 | * | 12/1998 | Sato et al. ........................ 73/204.26 |

OTHER PUBLICATIONS

Siemens, "Mass Airflow Meter", Nov., 1997.

Uwe Konzelmann, Hans Hecht and Manfred Lembke, "Breakthrough In Reverse Flow Detection—A New Mass Air Flow Meter Using Micro Silicon Technology", SAE Technical Paper 950433; Reprinted from: Electronic Engine Controls 1995.

\* cited by examiner

Primary Examiner—Benjamin R. Fuller
Assistant Examiner—Jewel V. Thompson
(74) Attorney, Agent, or Firm—Vincent A. Cichosz

(57) ABSTRACT

A mass flow sensor for measuring flow of a medium comprises a body, a membrane fixed on the body, a pair of thin film heating elements arranged on the membrane, and a sensing element arranged on the membrane adjacent the pair of heating elements and connected between the pair of heating elements. The heating elements are further arranged in a spaced relationship, transverse to the direction of medium flow such that one heating element is upstream of the other heating element in the medium flow. The sensing element provides an electrical signal for determining the voltage across the total series resistance of the heating elements which is indicative of the medium flow magnitude, and for determining the relative resistance of the upstream heating element compared to the downstream heating element which is indicative of medium flow direction. In another aspect of the invention a system for measuring flow of a medium is disclosed. The system includes the mass flow sensor of the present invention and associated circuitry for determining the magnitude and direction of a medium flow.

17 Claims, 2 Drawing Sheets

MASS AIR FLOW METER

BACKGROUND OF THE INVENTION

1. Field of the Invention

The present invention is related to the field of airflow sensors. More particularly, the invention relates to a silicon-based mass airflow sensor arranged on a membrane. The sensor includes heating elements and a measuring element to determine the intensity and direction of flow of the fluid medium based on the transfer of heat into the medium.

2. Description of Related Art

In the automotive industry in particular, a need has arisen for mechanically rugged and reliable sensors which have an extremely fast response time. For example, in an electronic engine control system it is often necessary to provide rate data of mass airflow to determine the desired air-fuel ratio for target fuel efficiency and emission requirements.

Conventional mass airflow sensors are of several types: "hot-wire" sensors, conventional bi-directional airflow sensors, and "reverse flow" compensating airflow sensors. Conventional "hot wire" sensors are fabricated with a fine resistive wire such as platinum or tungsten supported in an air stream or wound on a ceramic bobbin, or as a thin film deposited on the bobbin. In operation, a known current flows through the wire to heat the resistive element to a predetermined temperature. When air flows across the elements, it alters the rate of heat transfer from the heated element, thereby causing a temperature change in the wire as well as a resulting change in resistance. Corresponding circuitry determines the voltage level required to maintain the predetermined temperature. This voltage level is then used to indicate the magnitude of airflow.

The hot-wire type of sensor has several limitations. In particular, due to the sensor's significant thermal mass, it has a relatively low response time which can overestimate true flow. In addition, due to its size, the overall mass airflow sensor is often more bulky than desired. Furthermore, the sensor does not indicate flow direction.

Conventional bi-directional airflow sensors typically comprise a central heating element and upstream and downstream temperature sensing elements. In operation, the upstream sensing element is cooled slightly more than the downstream sensing element under airflow conditions, and the temperature difference between the two sensing elements results in an electrical current difference between them. This current difference is then converted to a voltage difference which represents the magnitude of the airflow. The sign of the difference between the temperatures indicates flow direction.

The conventional bi-directional sensor has a number of disadvantages. For example, the corresponding readout circuitry requires several interconnections between the sensing elements and the remainder of the circuit. Each additional interconnection represents an incremental increase in the overall sensor cost, as well as a potential reliability issue.

Finally, conventional "reverse flow compensating" airflow sensors comprise two independent heating elements parallel to each other, transverse to the airflow. Independent electronic circuits maintain each heating element at a predetermined temperature. The voltage level required to maintain the desired temperature of the upstream heating element indicates the magnitude of airflow. For reverse flow, this voltage is suppressed. Thus, the output of the sensor in reverse flow is similar to that of a "half wave" rectifier.

Accordingly, there is a need for a mass airflow sensor having a fast response speed, high flow sensitivity, long term reliability, and the ability to detect the direction as well as the magnitude of the airflow.

SUMMARY OF THE INVENTION

The present invention overcomes the drawbacks associated with conventional mass airflow sensors through the provision of a mass flow sensor for measuring flow of a medium. The sensor includes a body, a membrane fixed on the body, a pair of thin-film heating elements arranged on the membrane, and a sensing element arranged on the membrane adjacent the pair of heating elements. The heating elements are further arranged in a spaced relationship, transverse to the direction of medium flow such that one of the heating elements is upstream of the other heating element in the medium flow. The sensing element provides an electrical signal for determining the voltage of the total series resistance of the heating elements which is indicative of the medium flow magnitude and for determining the relative resistance of the upstream heating element compared to the downstream heating element which is indicative of medium flow direction.

In another aspect of the invention a system for measuring flow of a medium is disclosed. The system includes a mass flow sensor and associated circuitry for determining the magnitude and direction of a medium flow. The system includes a mass flow sensor comprising a body, a membrane fixed on the body, a pair of heating elements arranged on the membrane, and a center tap sensing element arranged on the membrane and connected adjacent the pair of heating elements. The heating elements are further arranged in a spaced relationship, transverse to the direction of medium flow such that one heating element is upstream of the other heating element in the medium flow. In addition, the sensing element provides a center tap voltage value between the pair of heating elements. The system further includes an ambient air sensing element connected to the mass flow sensor such that the ambient air sensing element provides an ambient air temperature value. In addition, the system includes a self-balancing bridge circuit connected to the pair of heating elements for maintaining the heating elements at a temperature above the ambient air temperature value. The bridge circuit provides a heater element voltage value, such that the ratio of the center tap voltage value to the heater element voltage value is indicative of the medium flow magnitude and direction.

One advantage of the present invention is that it provides bi-directional mass airflow detection. Another advantage of the present invention is that it requires less electronic circuitry and fewer interconnections between the sensing element and the remainder of the circuit as compared to conventional airflow sensors, thereby reducing costs and increasing reliability.

Other objects and advantages of the invention will become apparent upon reading the following Detailed Description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF THE PREFERRED EMBODIMENT

Figure 1:
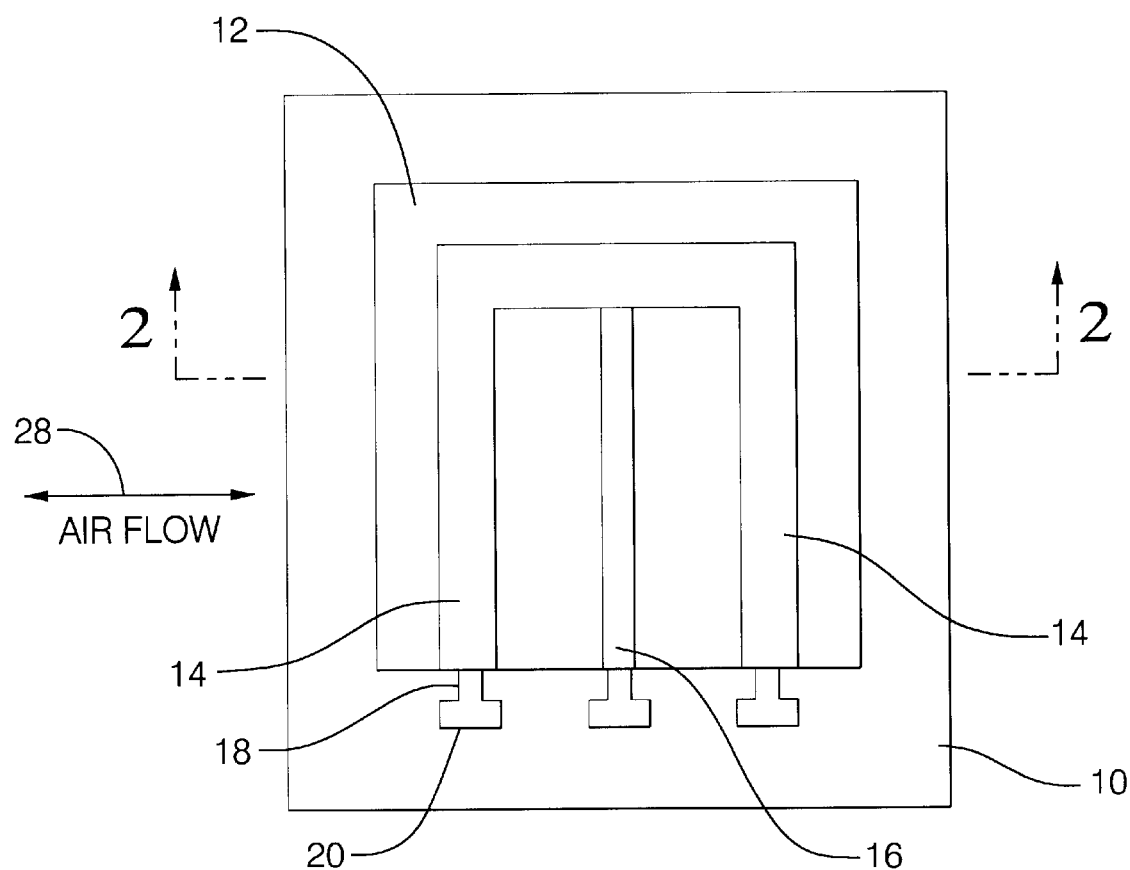
FIG. 1 shows a plan view of an airflow sensor according to one embodiment of the present invention.
Figure 2:
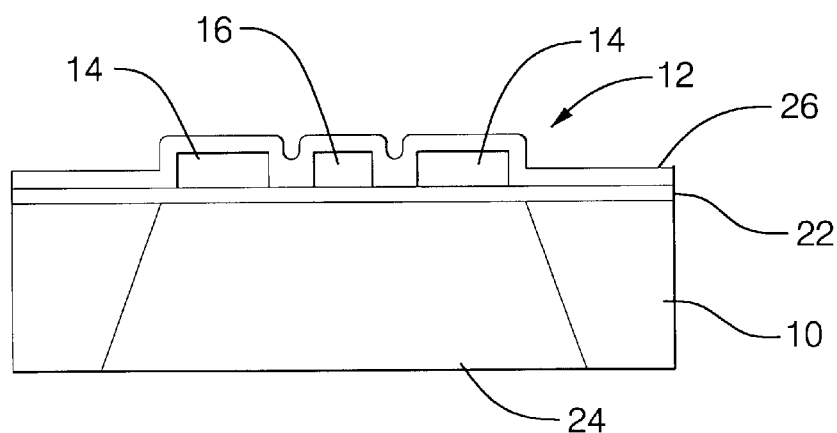
FIG. 2 shows a cross-sectional view of the airflow sensor of FIG. 1 along line 2—2.

FIG. 1 shows a plan view of one embodiment of an airflow sensor according to the present invention. FIG. 2 shows a cross-sectional view of the sensor of FIG. 1 along the line 2—2. The airflow sensor has a body 10 of monocrystalline silicon in which a membrane 12 is fixed. Although the sensor can be advantageously manufactured of silicon, it is not necessary to do so. Other suitable materials will also present themselves to one of skill in art. A hot film anemometer circuit for airflow measure is implemented on the membrane. The circuit comprises two heating elements 14. The heating elements 14 are electrically in series, arranged parallel, and proximate to each other such that one heating element 14 is upstream of the other heating element 14 relative to the direction of airflow across the sensor. A sensing element 16 is also arranged on the membrane and represents the voltage at the center tap between the two heating elements 14. The heating elements 14 and sensing element 16 are contacted by interconnect traces 18 and are able to be connected through bonding pads 20 to external operating and evaluation circuitry as described in more detail below with reference to FIGS. 3 and 4.

The heating elements 14 and sensing element 16 can be manufactured in several ways. For example, they can be formed out of wires and discrete resistors, or, preferably, patterned out of film deposited on a substrate as shown in FIG. 1. To manufacture the sensor, a membrane layer 22 is provided which initially covers the entire surface of the top surface of a silicon substrate. Preferably, the body 10 is comprised of silicon because of its advantageous properties which allow micromachining and the ability to grow a membrane on its surface. The membrane layer 22 forms the membrane 12 on which the heating elements 14 and sensing element 16 are formed. The heating elements 14 and the sensing element 16 are expediently manufactured by depositing a metal layer over the entire surface of the membrane layer 22. The heating elements 14 and the sensing element 16 are then patterned out of the full surface metal layer by means of photolithography and etching. At the same time, the interconnect traces 18 and the bonding pads 20, which differ from the heating elements 14 and sensing element 16 only with respect to the width of the pattern, may also be patterned out of the metal layer at the same time. In addition, preferably, a recess 24 extending from the bottom surface of the silicon substrate to the membrane layer 22 is etched into the silicon substrate. The recess 24 thus forms the body 10 on the top side of which the membrane layer 22 extends.

Although the sensing element 16 is shown in FIGS. 1 and 2 as running between the heating elements 14, it is only important that the voltage it senses be between the heating element traces 14. Accordingly, the trace for the sensing element 16 can also terminate to the left, right, or above the heating elements 14. Thus, the sensing element 16 will be referred to as adjacent the heating elements 14, but not necessarily between the heating elements. This allows more flexibility in optimizing the spacing between the upstream and downstream heating elements 14 without regard to the space occupied by the sensing element 16 and associated clearance around it.

Although the heating elements 14, sensing elements 16, interconnect traces 18 and bonding pads 20 are preferably formed out of a single metal layer such as platinum, it is not necessary that they all be the same material. The heating elements 14 need only be made of a material with a high temperature coefficient of resistance, such as platinum, gold or silver, to allow a temperature difference to result in a resistance differential between the two heating elements 14 in the presence of airflow.

A passivation layer 26 may also be deposited on the top side of the sensor to prevent contaminants from interfering with the functioning of the heating elements 14 and sensing element 16.

In operation, the heating elements 14 are heated to a temperature which is greater than the ambient air temperature regardless of the airflow across the sensor. When a medium flow, such as an airflow, as indicated by the air flow 28, flows along the top side of the membrane 12, the medium flow has a cooling effect on the membrane 12. As a result, because the heating elements 14 are oriented such that one element lies upstream of the other, the temperatures of the respective heating elements 14 will differ from each other as a function of the airflow. Specifically, the upstream heating element 14 will be cooled by the airflow more than the downstream heating element 14, since the downstream element will be contacted by air that has been heated by the upstream element. Because the heating elements 14 are fabricated from a material with a high temperature coefficient of resistance, this temperature difference results in a resistance difference between the heating elements 14. However, the circuit functions to maintain the total series resistance of the two heating elements 14 constant. Thus, the relative resistance of the upstream heating element compared to the downstream heating element provides an indication of airflow magnitude and direction. Two possible embodiments for determining airflow magnitude and direction will now be discussed with reference to FIGS. 3 and 4.

Figure 3:
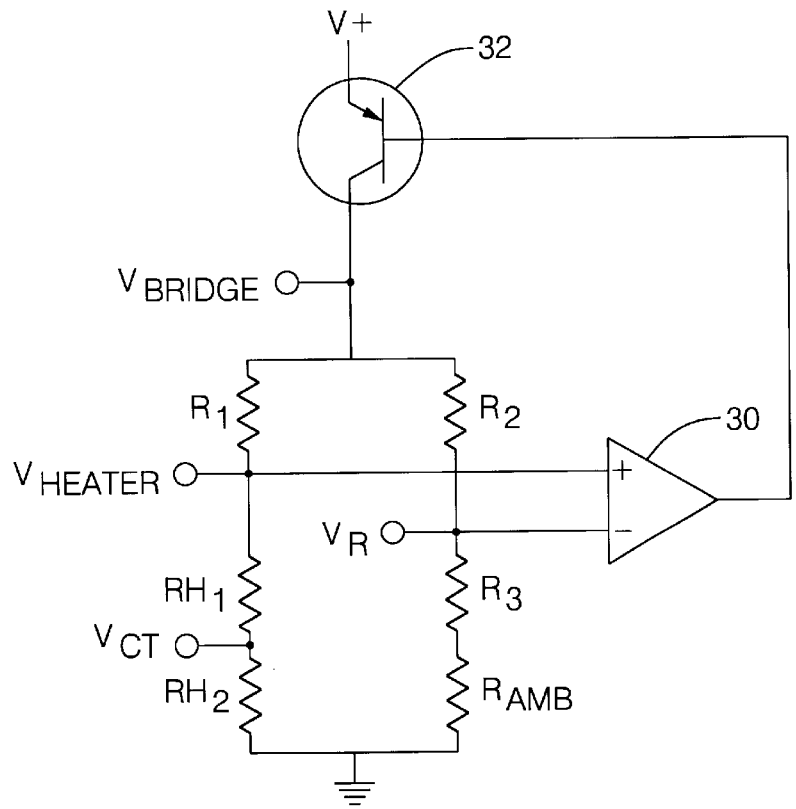
FIG. 3 shows an electrical schematic diagram of the sensor of FIG. 1 and associated sensing circuitry.

FIG. 3 shows an electrical schematic diagram of the airflow sensor of FIG. 1 and associated sensing circuitry. In this circuit, the heating elements are represented by resistors $RH_1$ and $RH_2$ and the center tap sensing element is represented by the voltage $V_{CT}$. The resistance $R_{AMB}$ is used to sense the ambient air temperature that the sensor is operating in. The ambient temperature sensing resistor $R_{AMB}$, like the heating elements $RH_1$ and $RH_2$ is preferably fabricated from a material with a high temperature coefficient of resistance such as platinum. In contrast, the resistors $R_1$, $R_2$, and $R_3$ are preferably fixed, low temperature coefficient resistors, whose values are chosen to achieve a heating element temperature and a desired value above the temperature sensed by the ambient temperature sensor $R_{AMB}$. The amplifier 30 and transistor 32 achieve a self-balancing bridge circuit which maintains the heating element temperatures at the desired level above the ambient air temperature regardless of the airflow across the heating elements. This is achieved by the amplifier 30 driving the transistor 32 to maintain the voltage $V_R$ equal to the voltage $V_{HEATER}$.

As a result of the driver circuits, the voltage $V_{BRIDGE}$ required to maintain the heating elements at the desired temperature indicates the airflow magnitude, regardless of the airflow direction. The circuit functions to maintain the total series resistance of the two heating elements $RH_1$ and $RH_2$ constant. However, because the two heating elements $RH_1$ and $RH_2$ are oriented such that one lies upstream of the other, the temperatures of the heating elements will differ from each other as a function of airflow. This temperature difference results in a resistance difference between the two heating elements $RH_1$ and $RH_2$. The relative resistance of the upstream heating element compared to the downstream heating element provides an indication of airflow direction. This can be determined in several ways.

For example, the ratio of $V_{CT}/V_{HEATER}$ provides an indication of flow magnitude and direction. In addition, the value of the bridge voltage, $V_{BRIDGE}$, represents airflow magnitude.

Figure 4:
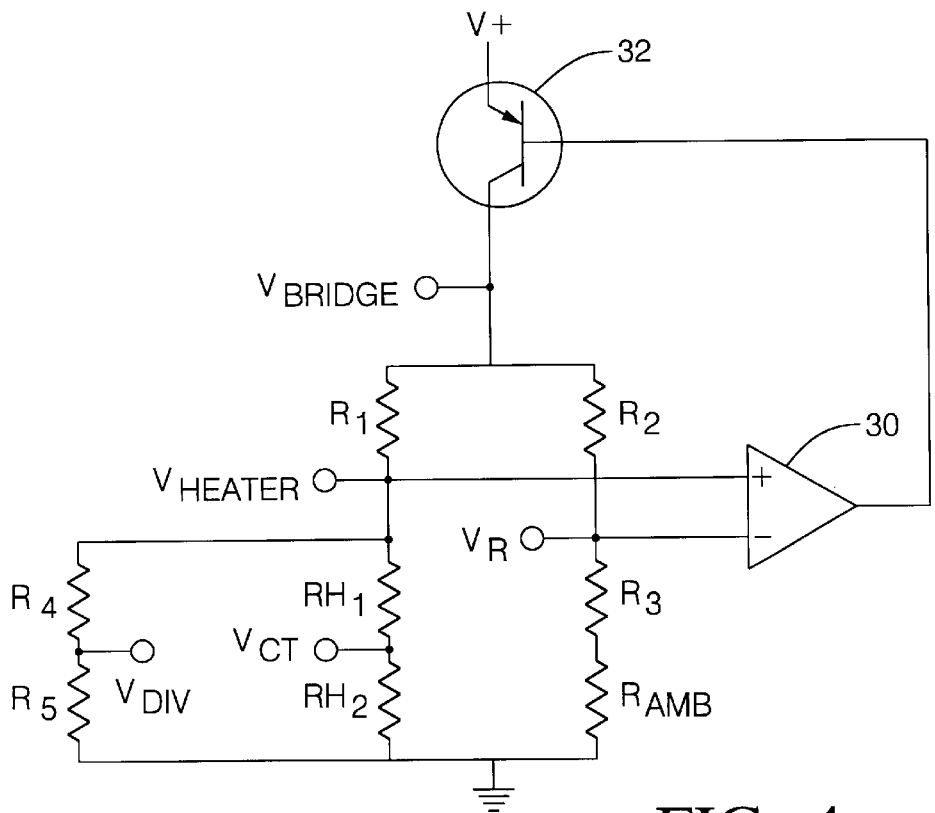
FIG. 4 shows an electrical schematic diagram of another embodiment of an airflow sensor according to the present invention with associated sensing circuitry.

FIG. 4 shows another embodiment of an electrical circuit for use with the airflow sensor of the present invention to determine airflow magnitude and direction. FIG. 4 is similar to FIG. 3 and, therefore, like components have been given the same reference characters. FIG. 4 differs from FIG. 3, however, with the addition of a resistor divider comprising resistors $R_4$ and $R_5$ and voltage sensing terminal $V_{DIV}$. In this way, the difference between $V_{CT}$ and $V_{DIV}$ represents an indication of flow direction. $R_4$ and $R_5$ are preferably chosen such that the difference between the voltages $V_{DIV}$ and $V_{CT}$ is zero (0) with no applied airflow. The sign of the voltage difference, $V_{DIV}$-$V_{CT}$, would then be positive for flow in one direction, and negative for flow in the opposite direction. In addition, as described above with reference to FIG. 3, the value of $V_{HEATER}$ or $V_{BRIDGE}$ represents an indication of airflow magnitude.

An alternative embodiment for the electrical circuit of FIG. 4 is to substitute a second center-tapped heater for resistors $R_4$ and $R_5$. Thus, both $R_4$ and $R_5$ would comprise heating elements similar to $RH_1$ and $RH_2$. In such an arrangement, if $RH_1$ is upstream relative to $RH_2$, preferably heating element $R_5$ is upstream relative to heating element $R_4$. This full bridge configuration delivers twice the signal output of the configuration of FIG. 4 with fixed resistive values for $R_4$ and $R_5$.

From the foregoing it will be seen that there has been brought to the art a new and improved airflow sensor which overcomes the drawbacks associated with conventional airflow sensors. While the invention has been described in connection with one or more embodiments, it will be understood that the invention is not limited to those embodiments. On the contrary, the invention covers all alternatives, modifications, and equivalents as may be included within the spirit and scope of the appended claims.

What is claimed is:

1. A mass flow sensor for measuring flow of a medium comprising:
   a pair of electrically resistive heating elements coupled in series and having a first voltage impressed thereacross, said pair of heating elements arranged in spaced adjacency such that one of said pair of heating elements is upstream of another of said pair of heating elements relative to the medium flow; and
   a sensing element electrically coupled between said pair of heating elements, said sensing element providing a second voltage thereat, whereby said first and second voltages in various individual and combinative uses are indicative of at least one of direction and magnitude of flow of said medium.

2. The mass flow sensor of claim 1 further comprising a body and a membrane fixed on said body, said body comprising a frame of monocrystalline silicon on which said membrane is suspended and wherein said pair of electrically resistive heating elements and said sensing element are arranged on said membrane.

3. The mass flow sensor of claim 1 wherein said pair of electrically resistive heating elements are formed of a material having a high temperature coefficient of resistance.

4. The mass flow sensor of claim 3 wherein said pair of electrically resistive heating elements are formed of platinum.

5. A system for measuring flow of a medium comprising:
   (a) a mass flow sensor comprising:
      a pair of heating elements arranged in a spaced relationship, transverse to a direction of medium flow such that one of said heating elements is upstream of another of said heating elements in the medium flow; and
      a center tap sensing element arranged adjacent said pair of heating elements and connected between said pair of heating elements, said sensing element providing a center tap voltage value between said pair of heating elements;
   (b) an ambient air sensing element connected to said mass flow sensor, said ambient air sensing element providing an ambient air temperature value; and
   (c) a self-balancing bridge circuit connected to said pair of heating elements for maintaining said pair of heating elements at a temperature above said ambient air temperature value, said bridge circuit providing a heater element voltage value, wherein a ratio of said center tap voltage value to said heater element voltage value is indicative of the medium flow magnitude and direction.

6. The system of claim 5 wherein said mass flow sensor comprises a body and a membrane fixed on said body, said body comprising a frame of monocrystalline silicon on which said membrane is suspended and wherein said pair of heating elements and said center tap sensing element are arranged on said membrane.

7. The system of claim 5 wherein said pair of heating elements and said ambient air temperature measuring element are formed of a material having a high temperature coefficient of resistance.

8. The system of claim 7 wherein said pair of heating elements and said ambient air temperature measuring element are formed of platinum.

9. The system of claim 5 wherein said bridge circuit comprises an amplifier and a transistor.

10. The system of claim 9 wherein said transistor further provides a bridge voltage value indicative of the magnitude of medium flow across said pair of heater elements.

11. A system for measuring flow of a medium comprising:
    (a) a mass flow sensor comprising:
       a pair of heating elements arranged in a spaced relationship, transverse to a direction of medium flow such that one of said heating elements is upstream of another of said heating elements in the medium flow; and
       a center tap sensing element arranged adjacent said pair of heating elements and connected between said pair of heating elements, said sensing element providing a center tap voltage value between said pair of heating elements;
    (b) an ambient air sensing element connected to said mass flow sensor, said ambient air sensing element providing an ambient air temperature value;
    (c) a self-balancing bridge circuit connected to said pair of heating elements for maintaining said heating elements at a temperature above said ambient air temperature value, said bridge circuit providing a heater element voltage value; and
    (d) a resistor-divider network connected in parallel with said pair of heater elements, said resistor-divider network including a center node providing a divider voltage value, wherein a sign of a difference between said center tap voltage value and said divider voltage value is indicative of the medium flow direction, and wherein said heater element voltage value is indicative of the medium flow magnitude.

12. The system of claim 11 wherein said mass flow sensor comprises a body and a membrane fixed on said body, said body comprising a frame of monocrystalline silicon on which said membrane is suspended and wherein said pair of heating elements and said center tap sensing element are arranged on said membrane.

13. The system of claim 11 wherein said pair of heating elements and said ambient air temperature measuring element are formed of a material having a high temperature coefficient of resistance.

14. The system of claim 13 wherein said pair of heating elements and said ambient air temperature measuring element are formed of platinum.

15. The system of claim 11 wherein said bridge circuit comprises an amplifier and a transistor.

16. The system of claim 15 wherein said transistor further provides a bridge voltage value indicative of the magnitude of medium flow across said pair of heater elements.

17. The system of claim 11 where said resistor-divider network comprises two resistors wherein each resistor is formed of a material having a high temperature coefficient of resistance, said resistor divider network arranged transverse to the direction of medium flow such that one of said resistors is upstream of the other in the medium flow.

* * * * *